US012615258B2

(12) United States Patent (10) Patent No.: US 12,615,258 B2
Bever et al. (45) Date of Patent: *Apr. 28, 2026

(54) AUTOMATED CONTENT TRANSPORT SECURITY

(71) Applicant: Disney Enterprises, Inc., Burbank, CA (US)

(72) Inventors: Rebecca Bever, Burbank, CA (US); Sarah Y. Moon, Los Angeles, CA (US); Erika Varis Doggett, Los Angeles, CA (US); Bethany Harvey Frauenberger, Canyon Country, CA (US); Eric J. Avila, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 18/750,957

(22) Filed: Jun. 21, 2024

(65) Prior Publication Data

US 2024/0348615 A1 Oct. 17, 2024

Related U.S. Application Data

(63) Continuation of application No. 17/492,334, filed on Oct. 1, 2021, now Pat. No. 12,047,378.

(51) Int. Cl.
| | |
|---|---|
| *H04L 9/40* | (2022.01) |
| *G06F 21/10* | (2013.01) |
| *G06N 20/00* | (2019.01) |

(52) U.S. Cl.
CPC .............. *H04L 63/10* (2013.01); *G06F 21/10* (2013.01); *G06N 20/00* (2019.01); *H04L 63/0245* (2013.01)

(58) Field of Classification Search
None
See application file for complete search history.

(56) References Cited

U.S. PATENT DOCUMENTS

| | | | | |
|---|---|---|---|---|
| 9,641,544 B1* | 5/2017 | Treat | ....................... | H04L 43/04 |
| 2019/0182268 A1* | 6/2019 | Lancioni | ................. | H04L 43/04 |
| 2019/0313161 A1* | 10/2019 | Wilms | ............... | H04N 21/8456 |

* cited by examiner

*Primary Examiner* — Suman Debnath
(74) *Attorney, Agent, or Firm* — Farjami & Farjami LLP

(57) ABSTRACT

A content transport security system includes a computing platform having processing hardware and a memory storing software code and a database including one or more business rule(s). The processing hardware executes the software code to intercept a content file including a content asset, during a file transfer of the content file between a client device and a destination device, determine an authorization status of the destination device, and decrypt the content file, using a decryption key corresponding to an encryption key available to the client device. The processing hardware further executes the software code to search the content asset for a forensic identifier, assign a classification to the file transfer, based on the authorization status and a result of the searching, the classification being one of allowable, forbidden, or suspicious, and allow or block the file transfer to the destination device, based on the classification and the business rule(s).

20 Claims, 5 Drawing Sheets

Fig. 3

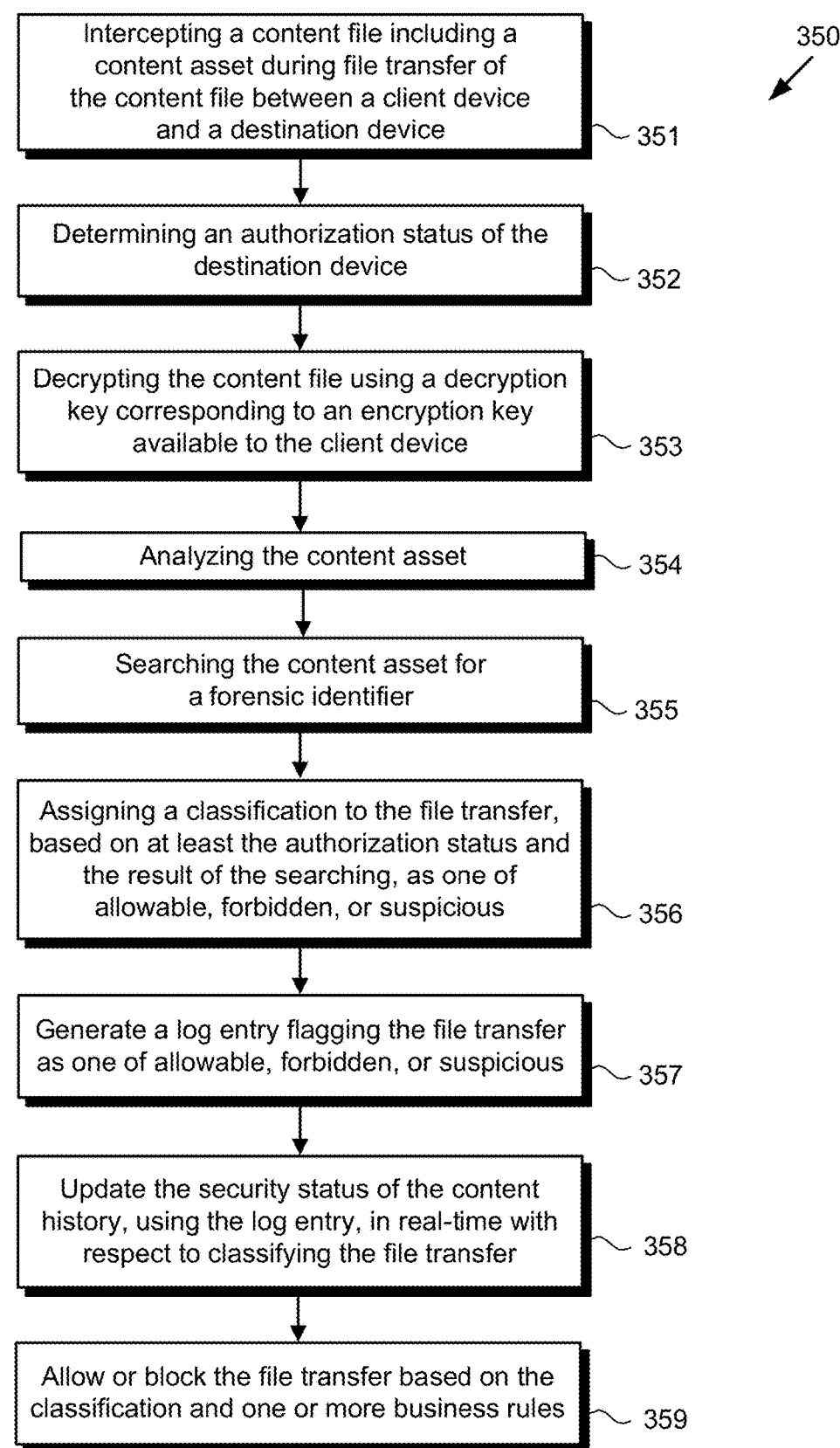

350

Intercepting a content file including a content asset during file transfer of the content file between a client device and a destination device ∽ 351

Determining an authorization status of the destination device ∽ 352

Decrypting the content file using a decryption key corresponding to an encryption key available to the client device ∽ 353

Analyzing the content asset ∽ 354

Searching the content asset for a forensic identifier ∽ 355

Assigning a classification to the file transfer, based on at least the authorization status and the result of the searching, as one of allowable, forbidden, or suspicious ∽ 356

Generate a log entry flagging the file transfer as one of allowable, forbidden, or suspicious ∽ 357

Update the security status of the content history, using the log entry, in real-time with respect to classifying the file transfer ∽ 358

Allow or block the file transfer based on the classification and one or more business rules ∽ 359

AUTOMATED CONTENT TRANSPORT SECURITY

The present application is a Continuation of U.S. application Ser. No. 17/492,334, filed Oct. 1, 2021, which is hereby incorporated by reference in its entirety into the present application.

BACKGROUND

Due to its popularity as a content medium, ever more digital content is being produced and made available to users. As a result, the efficiency with which such digital content can be managed and secured has become increasingly important to the producers, owners, and distributors of that content. One significant content management challenge in digital content production is tracking the location of a digital asset as it moves through a workflow pipeline having multiple collaborators, some of which may be internal resources of the digital content producer (e.g., a studio), and some of which may be resources or services provided to the digital content producer by external vendors.

Identifying the location of a digital asset can typically occur once a source of and destination for the digital asset are identified. However, in the case of digital content producers interfacing with many vendors for production and post distribution work, tracking the transfers of a digital asset among the digital content producer and vendors, as well as the transport pathways used for those transfers remains challenging. Although there are existing solutions in the networking and cyber-security fields that attempt to track digital assets, those solutions typically require localized applications in each environment in which the digital asset is processed or resides.

BRIEF DESCRIPTION OF THE DRAWINGS

FIG. 3 shows a flowchart outlining an exemplary method for automating content transport security, according to one implementation.

DETAILED DESCRIPTION

Figure 1:
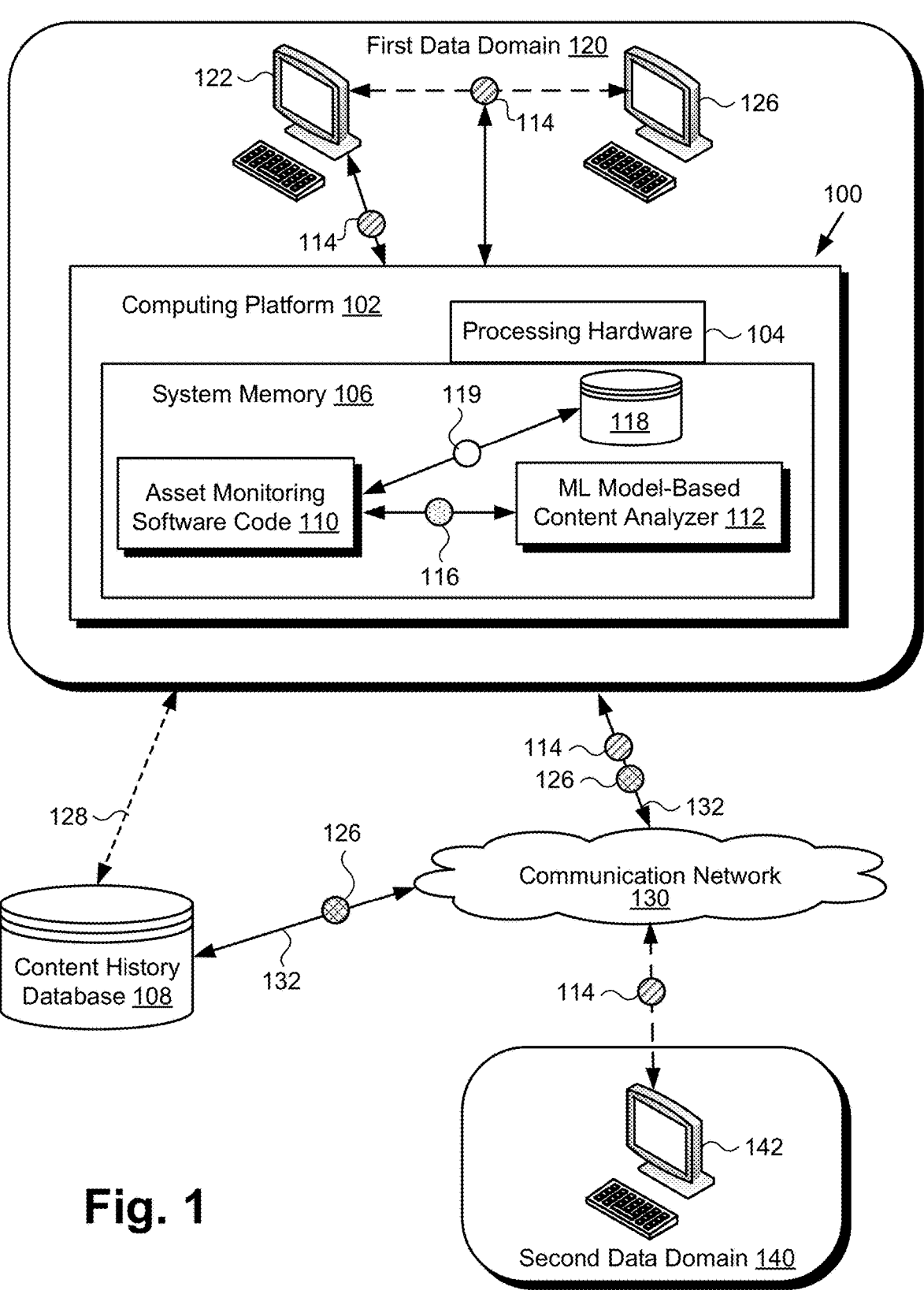
FIG. 1 shows a diagram of an exemplary system for automating content transport security, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for automating digital content transport security (hereinafter "content transport security") that overcome the drawbacks and deficiencies in the conventional art. By way of brief overview, the automated digital content transport security solution disclosed in the present application intercedes in a file transfer of a content file from a client device, such as a computer, to a destination device, such as another computer, evaluates data contained in the content file, classifies the file transfer as one of allowable, forbidden, or suspicious, and takes action accordingly, as described in greater detail below. In various implementations, the digital content secured using the systems and methods disclosed in the present application may include audio-video (AV) content in the form of video games, movies, or episodic television (TV) content that includes episodes of TV shows that are broadcast, streamed, or otherwise available for download or purchase on the Internet or via a user application. Alternatively, or in addition, that digital content may include one or more of software code, financial or business records, marketing or distribution plans, a graphical image or images, or other digital media content, for example, such as digital audio without video, digital video without audio, or animation.

It is noted that, as defined in the present application, the terms "automation," "automated," and "automating" refer to systems and processes that do not require the participation of a human user, such as a human system administrator. For example, although in some implementations a human system administrator may review the performance of the systems and methods disclosed herein, that human involvement is optional. Thus, the processes described in the present application may be performed under the control of hardware processing components of the disclosed systems.

FIG. 1 shows an exemplary content transport security system 100 automating content transport security, according to one implementation. As shown in FIG. 1, content transport security system 100 includes computing platform 102 having processing hardware 104 and system memory 106 implemented as a computer-readable non-transitory storage medium. According to the present exemplary implementation, system memory 106 stores asset monitoring software code 110, machine learning (ML) model-based content analyzer 112, and database 118.

It is noted that, as defined in the present application, the expression "machine learning model" or "ML model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs). Moreover, a "deep neural network," in the context of deep learning, may refer to an NN that utilizes multiple hidden layers between input and output layers, which may allow for learning based on features not explicitly defined in raw data. As used in the present application, a feature identified as an NN refers to a deep neural network. In various implementations, NNs may be trained as classifiers and may be utilized to perform image processing, audio processing, or natural-language processing.

As further shown in FIG. 1, content transport security system 100 is implemented within a use environment including content history database 108, communication network 130, first data domain 120 including content transport security system 100, client device 122, and destination device 126, as well as second data domain including destination device 142. In addition, FIG. 1 shows network communication links 132 communicatively coupling content history database 108 and second data domain 140 with content transport security system 100 via communication network 130. Also shown in FIG. 1 are content file 114, content asset 116 included in content file 114, one or more business rules 119 (hereinafter "business rule(s) 119"), and log entry 126 generated by asset monitoring software code 110.

Content transport security system 100 is responsible for recognizing, categorizing, modifying, and directing content traffic using any of the following: content recognition, deep learning-based content recognition, allow/deny lists, and the use of unique forensic identifiers such as hash values, content fingerprints, and watermarks, to name a few examples. Content history database 108 stores the unique forensic identifier assigned to content asset 116, along with metadata and a history of where content asset 116 has traveled. The information in content history database 108 is updated by content transport security system 100 in real-time with respect to a file transfer including content asset 116 in order to enable the owner of content asset 116 to know where that asset is at all times. It is noted that although content transport security system 100 may be communicatively coupled to content history database 108 via communication network 130 and network communication links 132, as shown in FIG. 1, in some implementations, content history database 108 may be integrated with computing platform 102, or may be in direct communication with content transport security system 100 as shown by dashed communication link 128.

It is further noted that each of first and second data domains 120 and 140 may be a distinct computing environment, for example, controlled by different owners and governed by different administrative procedures and security protocols. By way of example, first data domain 120 may be owned and controlled by a digital content production studio, while second data domain 140 may be owned and controlled by a remote third-party vendor providing external resources or services for processing digital content originating from first data domain 120, such as content asset 116 included in content file 114. That is to say, first data domain 120 may be governed by a first security protocol, while second data domain 140 may be governed by a second security protocol different from the first security protocol governing first data domain 120. It is further noted that, as used in the present application, the expression "first data domain 120 and second data domain 140 being governed by different security protocols," and the like, may refer to the implementation of distinct authentication and encryption strategies by each of first and second data domains 120 and 140, that would typically require separate key management solutions for accessing data files stored on those domains.

It is also noted that although FIG. 1 shows two data domains, one client device, and two destination devices in the interests of conceptual clarity, in other implementations, content transport security system 100 may be communicatively coupled to more than one external data domain, such as tens or hundreds of data domains for example, each including multiple client devices corresponding to client device 122 and multiple destination devices corresponding to destination devices 126 and 142.

Moreover, although the exemplary implementation shown in FIG. 1 corresponds to file transfer of content file 114 between client device 122 and destination device 126 both internal to first data domain 120, as well as to file transfer of content file 114 between client device 122 and external destination device 142, the present novel and inventive principles also apply to ingestion of content into first data domain 120 from an external source, such as second data domain 140. Exemplary specific use cases of content file transfers include, but are not limited to:

1. Video reference materials such as visual effects (VFX), editorial, digital intermediate (DI), mastering, localization, and marketing files being sent out to external vendors.
2. Final video materials sent out to distribution partners.
3. Content such as work in progress or final materials created from the reference materials described in item 1 above being received from vendors.
4. Internal tracking of content location within a production studio among different departments including Pre-Production (e.g., concept development, art, scripts, storyboards), Production (e.g., on-set dailies, camera raw files), Post-Production (e.g., work in process (WIP) cuts, audio elements, metadata), Marketing (e.g., video/image reference files to create campaigns), Operations (e.g., localization reference files, censorship files, etc.), and Distribution (e.g., digital and/or non-theatrical distribution of final files).

With respect to the representation of content transport security system 100 shown in FIG. 1, it is noted that although asset monitoring software code 110, ML model-based content analyzer 112, and database 118 are depicted as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to processing hardware of a computing platform, such as processing hardware 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

It is further noted that although FIG. 1 depicts asset monitoring software code 110, ML model-based content analyzer 112, and database 118 as being mutually co-located in system memory 106, that representation is also merely provided as an aid to conceptual clarity. More generally, content transport security system 100 may include one or more computing platforms, such as computer servers for example, which may be co-located, or may form an interactively linked but distributed system, such as a cloud-based system, for instance. As a result, processing hardware 104 and system memory 106 may correspond to distributed processor and memory resources within content transport security system 100. Thus, it is to be understood that asset monitoring software code 110, ML model-based content analyzer 112, and database 118 may be stored remotely from one another within the distributed memory resources of content transport security system 100.

It is also noted that, in some implementations, ML model-based content analyzer 112 may take the form of a software module included in asset monitoring software code 110. However, in other implementations, ML model-based content analyzer 112 may be omitted from content transport security system 100 and the functionality attributed to that feature may be performed by asset monitoring software code 110.

Processing hardware 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as asset monitoring software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. As yet another alternative, in some implementations, content transport security system 100 may be implemented virtually, such as in a data center. For example, in some implementations, content transport security system 100 may be implemented in software, or as virtual machines.

Although client device 122 and destination devices 126 and 142 are shown as desktop computers in FIG. 1, those representations are provided merely as examples. More generally, each of client device 122 and destination devices 126 and 142 may be any suitable mobile or stationary computing device or system that implements data processing capabilities sufficient to provide a user interface, support connections to communication network 130, and implement the functionality ascribed to client device 122 and destination devices 126 and 142 herein. For example, in some implementations, one or more of client device 122 and destination devices 126 and 142 may take the form of a laptop computer, tablet computer, or smartphone, for example.

Figures 2A, 2B:
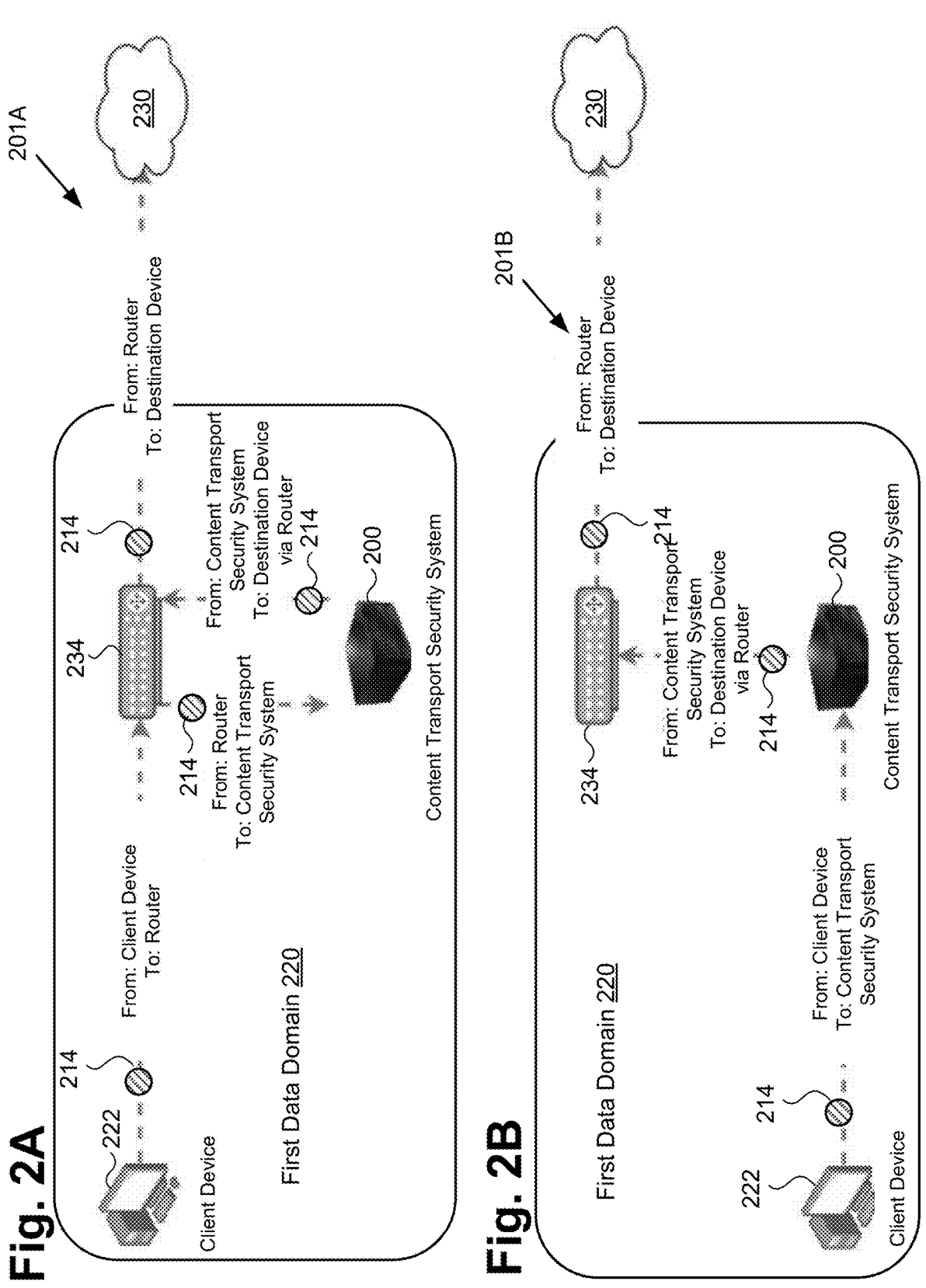
FIG. 2A shows a diagram of an exemplary digital content transport path that includes the system shown in FIG. 1, according to one implementation.
FIG. 2B shows a diagram of an exemplary digital content transport path that includes the system shown in FIG. 1, according to another implementation.

FIG. 2A shows a diagram of exemplary digital content transport path 201A including content transport security system 200, according to one implementation. As shown in FIG. 2A, content transport security system 200 intercedes in the file transfer of content file 214 from client device 222 within first data domain 220 to a destination device outside of first data domain 220 (destination device not shown in FIG. 2A) via router 234 and communication network 230.

Content transport security system 200, first data domain 220, client device 222, content file 214, and communication network 230 correspond respectively in general to content transport security system 100, first data domain 120, client device 122, content file 114, and communication network 130, in FIG. 1. Thus, content transport security system 200, first data domain 220, client device 222, content file 214, and communication network 230 may share any of the characteristics attributed to respective content transport security system 100, first data domain 120, client device 122, content file 114, and communication network 130 by the present disclosure, and vice versa. That is to say, although not shown in FIG. 1, like content transport security system 100, content transport security system 200 may include processing hardware 104 and system memory 106 storing asset management software code 110, ML model-based content analyzer 112, and database 118.

According to the exemplary implementation shown in FIG. 2A, client device 222 is any computing device that will accept a proxy. As further shown in FIG. 2A, content transport security system 200 is configured to intercept content file 214 at router 234 prior to its transfer out of first data domain 220. Content file 214 may be encrypted by client device 222 using an encryption key available to client device 222. For example, such an encryption key may have been provided to client device 222 by content transport security system 200 prior to the file transfer of content file 214. After intercepting content file 214 during the file transfer, content transport security system 200 is further configured to determine an authorization status of the destination device for content file 214, decrypt content file 214 using a decryption key corresponding to the encryption key available to client device 222, and search a content asset included in content file 214 for a forensic identifier, such as a hash value or watermark for example. Content transport security system 200 may then assign a classification to the file transfer, based on the authorization status of the destination device and a result of the search for a forensic identifier, where the classification optionally is one of allowable, forbidden, or suspicious, and allow or block the file transfer to the destination device, based on the classification and one or more business rules.

FIG. 2B shows a diagram of exemplary digital content transport path 201B including content transport security system 200, according to another implementation. It is noted that any feature identified by a reference number identical to that shown in FIG. 2A corresponds respectively to that previously described feature and may share any of the characteristics attributed to that corresponding feature by the present disclosure.

The exemplary implementation shown in FIG. 2B utilizes a transparent proxy when client device 222 is a device that does not allow proxy configurations. As shown in FIG. 2B, one way for content transport security system 200 to intercept content file 214 is with the destination Internet Protocol (IP) address intact is to configure client device 222 to use content transport security system 200 as the default gateway. As noted above, after intercepting content file 214, content transport security system 200 determines the authorization status of the destination device for content file 214, decrypts content file 214 using a decryption key corresponding to the encryption key used by client device 222 to encrypt content file 214, and searches a content asset included in content file 214 for a forensic identifier. Content transport security system 200 may then assign a classification to the file transfer, based on the authorization status of the destination device and a result of the search for a forensic identifier as one of allowable, forbidden, or suspicious, and allows or blocks the file transfer to the destination device, based on the classification and one or more business rules.

Figure 2C:
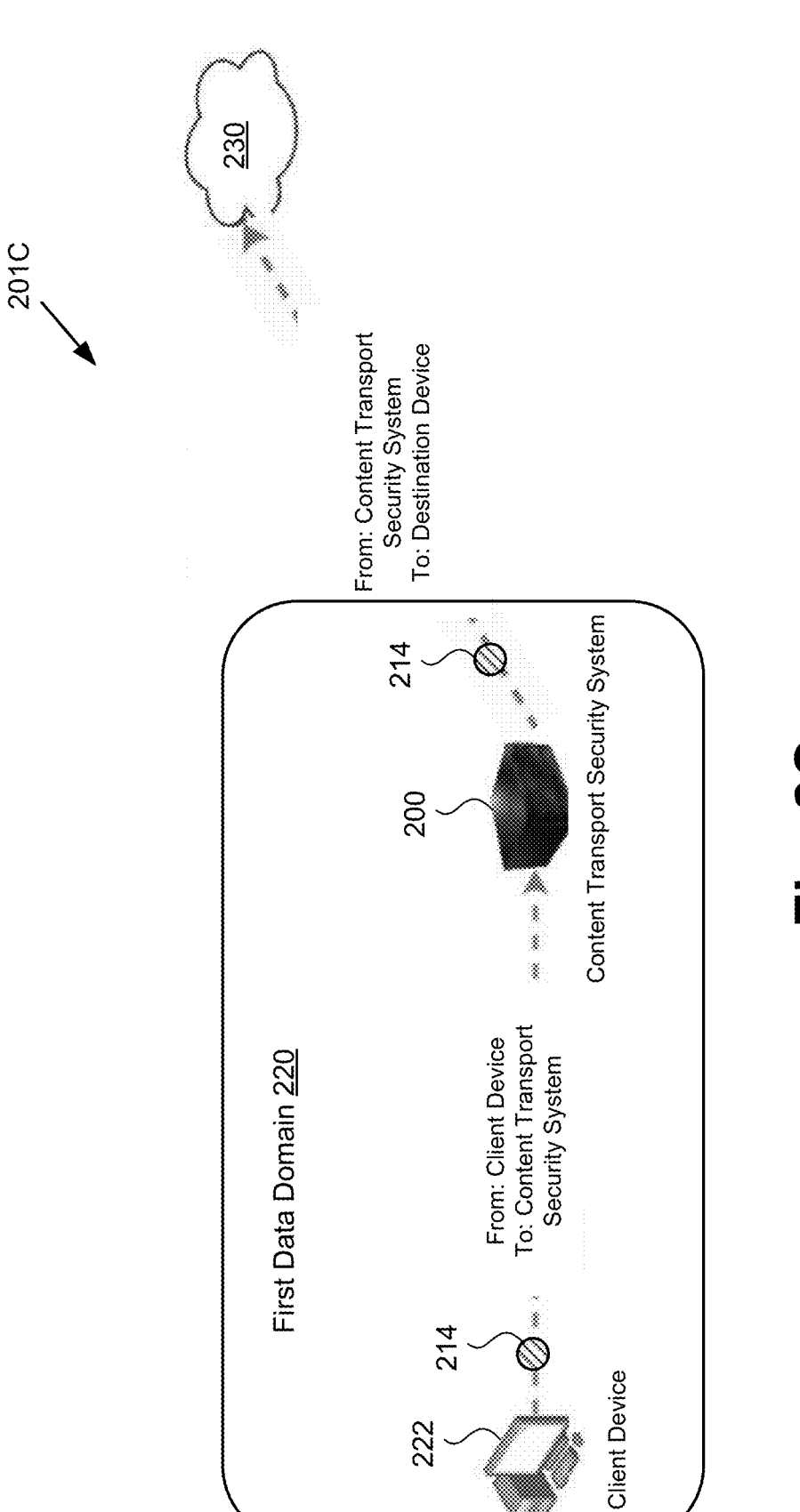
FIG. 2C shows a diagram of an exemplary digital content transport path that includes the system shown in FIG. 1, according to yet another implementation.

FIG. 2C shows a diagram of exemplary digital content transport path 201C including content transport security system 200, according to yet another implementation. Any feature identified by a reference number identical to those shown in FIG. 2A or 2B corresponds respectively to that previously described feature and may share any of the characteristics attributed to that corresponding feature by the present disclosure.

As shown in FIG. 2C, digital content transport path 201C is similar to digital content transport path 201B, in FIG. 2B, but omits router 234. As described above, after intercepting content file 214, content transport security system 200 determines the authorization status of the destination device for content file 214, decrypts content file 214 using a decryption key corresponding to the encryption key used by client device 222 to encrypt content file 214, and searches a content asset included in content file 214 for a forensic identifier. Content transport security system 200 then assigns a classification to the file transfer, based on the authorization status of the destination device and a result of the search for a forensic identifier as one of allowable, forbidden, or suspicious, and allows or blocks the file transfer to the destination device, based on the classification and one or more business rules.

The functionality of content transport security system 100/200 and asset monitoring software code 110 will be further described by reference to FIG. 3 in combination with FIGS. 1 and 4. FIG. 3 shows flowchart 350 presenting an exemplary method for automating content transport security, according to one implementation. With respect to the method outlined in FIG. 3, it is noted that certain details and features have been left out of flowchart 350 in order not to obscure the discussion of the inventive features in the present application.

Figure 4:
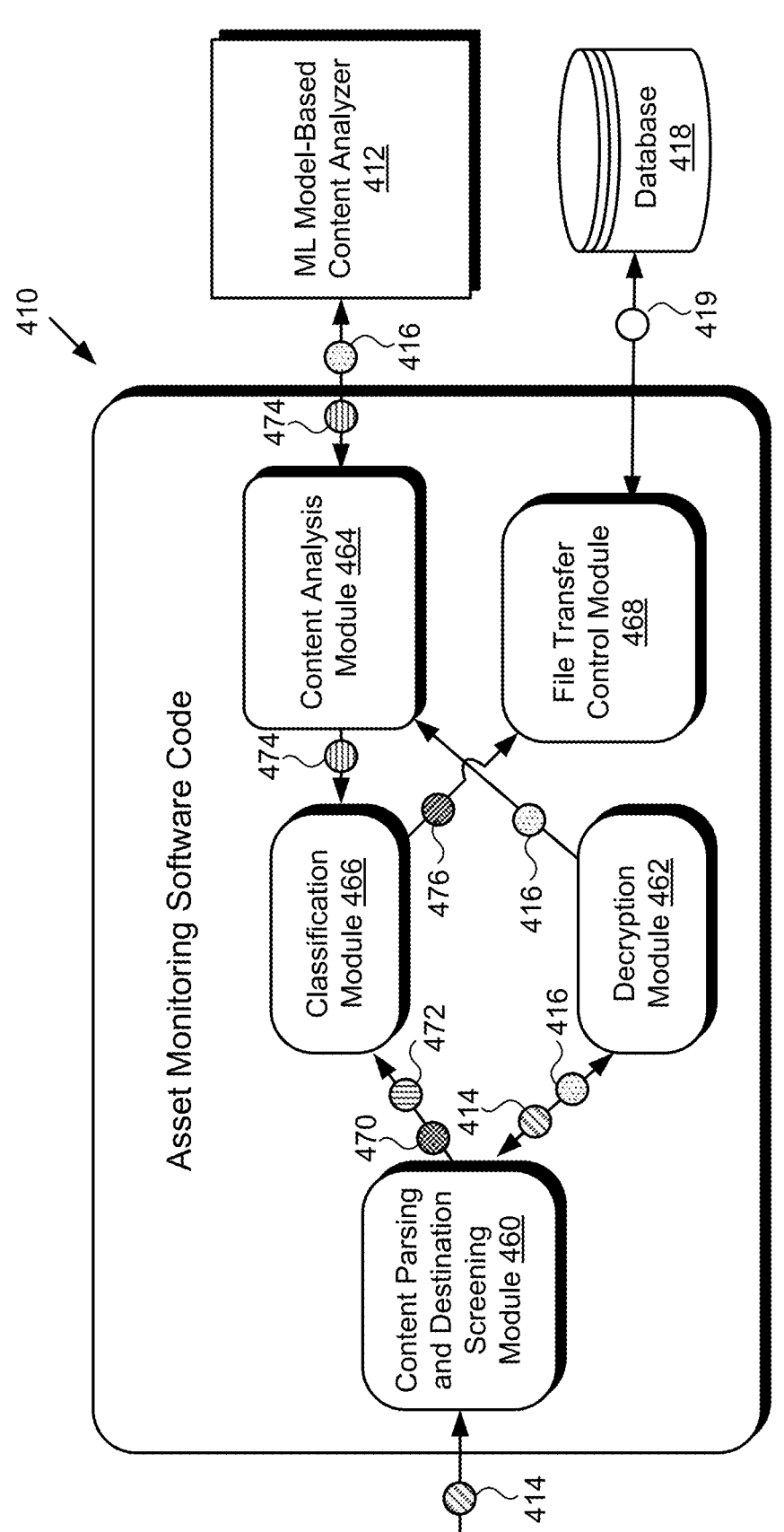
FIG. 4 shows a diagram of an exemplary software code suitable for use by the system shown in FIG. 1, according to one implementation.

FIG. 4 shows an exemplary diagram of asset monitoring software code 410 suitable for execution by content transport security system 100/200, according to one implementation. As shown in FIG. 4, asset monitoring software code 410 is communicatively coupled to ML model-based content analyzer 412 and database 418, and may include content parsing and destination screening module 460, decryption module 462, content analysis module 464, classification module 466, and file transfer control module 468. In addition, FIG. 4 shows content file 414, content asset 416 included in content file 414, authorization data 470, forensic identifier data 472, content analysis data 474, classification 476, and one or more business rules 419 (hereinafter "business rule(s) 419").

ML model-based content analyzer 412, database 418, content file 414, content asset 416, and business rule(s) 419 correspond respectively in general to ML model-based content analyzer 112, database 118, content file 114, content asset 116, and business rule(s) 119, in FIG. 1. Consequently, ML model-based content analyzer 412, database 418, content file 414, content asset 416, and business rule(s) 419 may share any of the characteristics attributed to respective ML model-based content analyzer 112, database 118, content file 114, content asset 116, and business rule(s) 119 by the present disclosure, and vice versa. In addition, asset monitoring software code 410 corresponds in general to asset monitoring software code 110, in FIG. 1, and those corresponding features may share any of the characteristics attributed to either feature. That is to say, like asset monitoring software code 410, asset monitoring software code 110 may include modules corresponding respectively to content parsing and destination screening module 460, decryption module 462, content analysis module 464, classification module 466, and file transfer control module 468.

Referring to FIG. 3 in combination with FIGS. 1 and 4, flowchart 350 begins with intercepting content file 114/414 including content asset 116/416, during a file transfer of content file 114/414 between client device 122 and either of destination devices 126 or 142 (action 351). As shown in FIG. 1, in some use cases, the destination device for file transfer of content file 114/414 is destination device 126 administered by first data domain 120 common to client device 122, serving as the source of the file transfer. However, in other use cases in which destination device 142 is to receive the file transfer, destination device 142 is administered in second data domain 140 controlled by a domain owner other than the owner of first data domain 120 from which the file transfer originates.

Content file 114/414 may include any of a wide variety of content as content asset 116/416, including, as noted above, software code, financial or business records, marketing or distribution plans, one or more graphical images, or other digital media content, for example, such as digital audio without video, digital video without audio, animation, or digital AV content, to name a few examples. Interception of content file 114/414 during the file transfer, may be performed using asset monitoring software code 110/410, and executed by processing hardware 104 of content transport security system 100.

It is noted that although action 351 alludes to transfer of content file 114/414 either within first data domain 120 or from first data domain 120 to second data domain 140, those examples are merely illustrative. As noted above, in some use cases, a file transfer secured using file transport security system 100 may involve ingestion of a content file into first data domain 120 from an external data domain, such as second data domain 140. Thus, although data domain 120 is referred to herein as a "first data domain" and data domain 140 is referred to as a "second data domain" as a matter of convenience, more generally, either of data domains 120 or 140 may serve as the "first data domain" recited by flowchart 350, and the other of data domains 120 and 140 may serve as the "second data domain."

Flowchart 350 further includes determining an authorization status of destination device 126 or 142 (action 352). For example, processing hardware 104 of content transport security system 100 may execute asset monitoring software code 110/410 to reference a registry of allowable destination devices for content files transferred from client device 122 or first data domain 120, a list of forbidden data domains for transfer of content files from first data domain 120, or may list allowable destination devices as well as forbidden destination devices. Determination of the authorization status of destination device 126 or 142 in action 352 may be performed by asset monitoring software code 110/410, executed by processing hardware 104 of content transport security system 100, using content parsing and destination screening module 460 to generate authentication data 470.

Flowchart 350 further includes decrypting content file 114/414, using a decryption key corresponding to an encryption key available to client device 122 (action 353). As noted above, in some implementations, content transport security system 100 may distribute encryption keys to client devices included in one or more of first data domain 120 and second data domain 140, such as exemplary client device 122. In those implementations, content transport security system 100 may retain corresponding decryption keys for decrypting content file 114/414 encrypted using such an encryption key. Decryption of content file 114/414 in action 353 may be performed by asset monitoring software code 110/410, executed by processing hardware 104 of content transport security system 100, using decryption module 462.

It is noted that although flowchart 350 and FIG. 4 depict action 352 as preceding action 353, that sequence is merely exemplary. In some implementations, action 352 may occur after action 353. Furthermore, in some implementations, actions 352 and 353 may be performed in parallel, i.e., substantially concurrently.

In some implementations, flowchart 350 may include optionally analyzing content asset 116/416 included in content file 114/414 (action 354). That is to say, action 354 is optional, and in some implementations may be omitted from the method outlined by flowchart 350. Nevertheless, in some implementations in which action 354 is performed, processing hardware 104 of content transport security system 100 may execute asset monitoring software code 110/410 to use content analysis module 464 to perform one or more of an audio analysis, a text analysis, or a visual analysis of content asset 116/416. Action 354, when performed, results in generation of content analysis data 474, which may be any data identifying or otherwise describing audio, text, or imagery included in content asset 116/416. As noted above, in some implementations, content transport security system 100 may include ML model-based content analyzer 112/412. In some of those implementations, the one or more of the audio analysis, the text analysis, or the visual analysis of content asset 116/416 of action 354 may be performed by asset monitoring software code 110/410, executed by processing hardware 104, and using ML model-based content analyzer 112/412.

Flowchart 350 further includes searching content asset 116/416 for a forensic identifier (action 355). As noted above, such a forensic identifier may take the form of one or more of a hash value, a content fingerprint, or a forensic watermark, for example. As a specific example, the forensic identifier of content asset 116/416 may include a Secure Hashtag Algorithm 2 (SHA-2) sum of content asset 116/416, such as a SHA-256 sum of content asset 116/416 for instance. Alternatively, or in addition, the forensic identifier may include a forensic watermark undetectable to the human eye, a content fingerprint such as a Universally Unique Identifier (UUID, also sometimes referred to as Globally Unique Identifier or GUID) of content asset 116/416, or both. The search of content asset 116/416 for a forensic identifier in action 355 may be performed by asset monitoring software code 110/410, executed by processing hardware 104 of content transport security system 100, and using content parsing and destination screening module 460 to generate forensic identifier data 472.

It is noted that in use cases in which the search of content asset 116/416 performed in action 355 detects a forensic identifier, forensic identifier data 472 includes that detected forensic identifier. However, in use cases in which the search performed in action 355 fails to detect a forensic identifier, forensic identifier data 472 reports that failure.

It is noted that although flowchart 350 and FIG. 4 depict action 354 as preceding action 355, that sequence is merely exemplary. In some implementations, action 354 may occur after action 355. Moreover, in some implementations, actions 354 and 355 may be performed in parallel, i.e., substantially concurrently. In still other implementations, action 354 may be omitted, and the method outlined by flowchart 350 may include action 355 following directly from actions 352 and 353.

Flowchart 350 further includes assigning a classification to the file transfer of content file 114/414 from client device 122 to destination device 126 or 142, based on the authorization status determined in action 352 and the result of the searching performed in action 355, the classification being one of allowable, forbidden, or suspicious (action 356). Action 356 may be performed by asset monitoring software code 110/410, executed by processing hardware 104 of content transport security system 100, and using classification module 466. In some implementations, classification module 466 receives authorization data 470 and forensic identifier data 472 and assigns classification 476 to the file transfer of content file 114/414 based on authorization data 470 and forensic identifier data 472. For example, where forensic identifier data 472 includes a forensic identifier detected by the search performed in action 355, processing hardware 104 may execute asset monitoring software code 110/410 to compare the detected forensic identifier with a forensic identifier of content asset 116/416 stored in content history database 108.

In addition, and as shown in FIG. 4, in some implementations, classification module 466 receives content analysis data 474 from content analysis module 464, in addition to receiving authorization data 470 and forensic identifier data 472 from content parsing and destination screening module 460. In those implementations, the assignment of classification 466 in action 356 may further be based on content analysis data 474.

In some implementations, flowchart 350 may further include generating log entry 126 flagging the file transfer of content file 114/414 as being assigned classification 466 of one of allowable, forbidden, or suspicious (action 357). Flagging the file transfer of content file 114/414 based on classification 466 may be performed by content monitoring software code 110/410, executed by processing hardware 104 of content transport security system 100.

In some implementations, flowchart 350 may further include updating a security status of content asset 116/416 in content history database 108, using log entry 126, in real-time with respect to assigning classification 466 to the file transfer of content file 114/414 in action 356 (action 358). Action 358 may be performed by content monitoring software code 110/410, executed by processing hardware 104 of content transport security system 100. Thus, although flowchart 350 shows action 356 as preceding actions 357 and 358, in some implementations, action actions 356 and 357, actions 356 and 358, or actions 356, 357, and 358 may be performed in parallel, i.e., substantially concurrently.

Updating the security status of content asset 116/416 in content history database 108 in action 358 advantageously enables the performance a variety of different types of data analytics including, but not limited to:

1. Remote granting or revocation of access rights to content file 114/414 or content asset 116/416.
2. Tracking how often content file 114/414 is opened.
3. Identifying a time series of instances in which content file 114/414 is accessed, to better assist security breach investigations.
4. Identifying patterns of access to content file 114/414, illustrating workflow bottlenecks or areas of high security risk, particularly identifying patterns of repeated breach, or including ML predictive models to anticipate where a security breach might happen given prior information on asset tracking as contained in content history database 108.
5. For content asset 116/416, for a given time: identifying who had access to it, when they were granted access.

6. Verifying whether content asset 116/416 had water-marking or another forensic identifier.

7. Determining how many different individuals or departments have content asset 116/416 end-to-end.

8. For the internal tracking within first data domain 120: identifying duplication of effort in internal workflow (e.g., how many different individuals internal to first data domain 120 accessed content asset 116/416 in order to perform the same or similar function on it), and finding trends in clustering of activities across departments.

Referring once again to flowchart 350 with continued further reference to FIGS. 1 and 4, flowchart 350 also includes allowing or blocking the file transfer of content file 114/414 based on classification 466 and business rule(s) 119/419 (action 359). It is noted that because business rule(s) 119/419 are predetermined and stored in database 118/418, business rule(s) 119/419 may be predetermined so as not to include conflicting business rules. To describe merely two examples: 1) business rule(s) 119/419 may specify that only file transfers classified as allowable in action 356 be allowed, while those classified as forbidden or suspicious be blocked. Alternatively: 2) business rule(s) 119/419 may specify that file transfers classified as allowable and suspicious be allowed and that all file transfers classified as forbidden be blocked, but that file transfers classified as suspicious, the file transfers classified as forbidden, or both, be flagged as such and reported to a cyber-security administrator of first data domain 120. Action 359 may be performed by content monitoring software code 110/410, executed by processing hardware 104 of content transport security system 100, using file transfer control module 468.

It is noted that although flowchart 350 shows actions 357 and 358 as preceding action 359, that sequence is merely exemplary. In some implementations, actions 357 and 358 may occur after action 359. Moreover, in some implementations, actions 356, 358 and 359 may be performed in parallel, i.e., substantially concurrently. In other implementation, action 358 may be omitted, while actions 357 and 359 may follow action 356 in any order, or may be performed in parallel with action 356. In still other implementations, actions 357 and 358 may be omitted, and the method outlined by flowchart 350 may include action 359 following directly from action 356 or performed in parallel with action 356.

With respect to the method outlined by flowchart 350, it is noted that actions 351, 352, 353, 355, 356, and 359, or actions 351, 352, 353, 354, 355, 356 and 359, or actions 351, 352, 353, 355, 356, 357, and 359, or actions 351, 352, 353, 354, 355, 356, 357, and 359, or actions 351, 352, 353, 355, 356, 357, 358, and 359, or actions 351, 352, 353, 354, 355, 356, 357, 358, and 359, may be performed in an automated process from which human participation may be omitted.

Thus, the present application discloses systems and methods for automating content transport security that overcome the drawbacks and deficiencies in the conventional art. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A content transport security system comprising:
a computing platform including a processing hardware and a system memory storing a software code;
the processing hardware configured to execute the software code to:
intercept an encrypted content file during a file transfer between a client device and a destination device;
decrypt the encrypted content file intercepted during the file transfer to obtain a decrypted content file;
perform at least one of an audio analysis or a visual analysis of the decrypted content file to provide content analysis data identifying at least one of audio or imagery, respectively, included in the decrypted content file;
assign a classification to the file transfer, based on the content analysis data, the classification being one of allowable, forbidden, or suspicious; and
allow or block the file transfer of the encrypted content file to the destination device, based on the classification.

2. The content transport security system of claim 1, further comprising a content history database, wherein the processing hardware is further configured to execute the content security software code to:
generate a log entry in a content history database flagging the file transfer as the one of allowable, forbidden, or suspicious.

3. The content transport security system of claim 2, wherein the processing hardware is further configured to execute the content security software code to:
update a security status of the encrypted content file in the content history database, using the log entry.

4. The content transport security system of claim 3, wherein updating the security status of the encrypted content file is performed in real-time with respect to assigning the classification to the file transfer.

5. The content transport security system of claim 1, further comprising a machine learning (ML) model-based content analyzer, wherein performing the at least one of the audio analysis or the visual analysis of the decrypted content file comprises extracting semantic media features from the decrypted content file using the ML model-based content analyzer.

6. The content transport security system of claim 1, wherein the processing hardware is further configured to execute the content security software code to:
search the decrypted content for a forensic identifier, and wherein the classification is further assigned based on the forensic identifier.

7. The content transport security system of claim 6, wherein the forensic identifier comprises a watermark.

8. The content transport security system of claim 6, wherein the forensic identifier comprises a hash value.

9. The content transport security system of claim 1, wherein the client device is administered in a first data domain controlled by a domain owner and the destination device is administered in a second data domain controlled by another domain owner.

10. The content transport security system of claim 1, wherein the at least one of the audio analysis or the visual analysis includes the audio analysis of the decrypted content to provide the content analysis data identifying at least the audio included in the decrypted content.

11. A method for use by a content transport security system including a computing platform having a processing hardware and a system memory storing a software code, the method comprising:

intercepting, by the software code executed by the processing hardware, an encrypted content file during a file transfer between a client device and a destination device;

decrypting, by the software code executed by the processing hardware, the encrypted content file intercepted during the file transfer to obtain a decrypted content file;

performing, by the software code executed by the processing hardware, at least one of an audio analysis or a visual analysis of the decrypted content file to provide content analysis data identifying at least one of audio or imagery, respectively, included in the decrypted content file;

assigning, by the software code executed by the processing hardware, a classification to the file transfer, based on the content analysis data, the classification being one of allowable, forbidden, or suspicious; and allowing or blocking, by the software code executed by the processing hardware, the file transfer of the encrypted content file to the destination device, based on the classification.

12. The method of claim 11, further comprising:

generating, by the software code executed by the processing hardware, a log entry in a content history database flagging the file transfer as the one of allowable, forbidden, or suspicious.

13. The method of claim 12, wherein the processing hardware is further configured to execute the content security software code to:

updating, by the software code executed by the processing hardware, a security status of the encrypted content file in the content history database, using the log entry.

14. The method of claim 13, wherein updating the security status of the encrypted content file is performed in real-time with respect to assigning the classification to the file transfer.

15. The method of claim 11, wherein performing the at least one of the audio analysis or the visual analysis of the decrypted content file comprises extracting semantic media features from the decrypted content file using the ML model-based content analyzer.

16. The method of claim 11, further comprising:

searching, by the software code executed by the processing hardware, the decrypted content for a forensic identifier, and wherein the classification is further assigned based on the forensic identifier.

17. The method of claim 16, wherein the forensic identifier comprises a watermark.

18. The method of claim 16, wherein the forensic identifier comprises a hash value.

19. The method of claim 11, wherein the client device is administered in a first data domain controlled by a domain owner and the destination device is administered in a second data domain controlled by another domain owner.

20. The method of claim 11, wherein the at least one of the audio analysis or the visual analysis includes the audio analysis of the decrypted content to provide the content analysis data identifying at least the audio included in the decrypted content.

\* \* \* \* \*